(12) United States Patent
Fisher et al.

(10) Patent No.: US 8,924,343 B2
(45) Date of Patent: Dec. 30, 2014

(54) METHOD AND SYSTEM FOR USING CONFIDENCE FACTORS IN FORMING A SYSTEM

(75) Inventors: Bradford Fisher, Chapel Hill, NC (US); Robert T. Uthe, Morrisville, NC (US)

(73) Assignee: International Business Machines Coporation, Armonk, NY (US)

( * ) Notice: Subject to any disclaimer, the term of this patent is extended or adjusted under 35 U.S.C. 154(b) by 2892 days.

(21) Appl. No.: 10/907,168

(22) Filed: Mar. 23, 2005

(65) Prior Publication Data

US 2006/0218155 A1    Sep. 28, 2006

(51) Int. Cl.
  G06F 7/00      (2006.01)
  G06Q 10/04    (2012.01)
  G06F 17/30    (2006.01)

(52) U.S. Cl.
  CPC .......... *G06F 17/30539* (2013.01); *G06Q 10/04* (2013.01)
  USPC ............ 707/603; 707/690; 709/224; 709/226

(58) Field of Classification Search
  USPC ........................... 707/603, 690; 709/224, 226
  See application file for complete search history.

(56) References Cited

U.S. PATENT DOCUMENTS

| | | | |
|---|---|---|---|
| 6,052,722 A | 4/2000 | Taghadoss | |
| 6,092,064 A | 7/2000 | Aggarwal et al. | |
| 6,178,529 B1 * | 1/2001 | Short et al. | 714/51 |
| 6,311,175 B1 * | 10/2001 | Adriaans et al. | 706/25 |
| 6,353,767 B1 * | 3/2002 | Wakeman et al. | 700/91 |
| 6,779,017 B1 | 8/2004 | Lamberton et al. | |
| 6,836,800 B1 * | 12/2004 | Sweet et al. | 709/224 |
| 7,082,463 B1 * | 7/2006 | Bradley et al. | 709/223 |
| 7,298,327 B2 * | 11/2007 | Dupray et al. | 342/451 |
| 8,775,585 B2 * | 7/2014 | Allen et al. | 709/223 |
| 2001/0013040 A1 | 8/2001 | Baumeister et al. | |
| 2004/0054680 A1 * | 3/2004 | Kelley et al. | 707/100 |
| 2005/0086473 A1 * | 4/2005 | Barkley et al. | 713/170 |
| 2005/0272452 A1 * | 12/2005 | Khoury et al. | 455/466 |

OTHER PUBLICATIONS

INSPEC: *NRP for the enterprise*—Clewett, A. et al.; AN-5639833.
*The Gestalt of an Information Technology Outsourcing Relationship: An Explorator Analysis*—Kern, T.; (1997), University of Oxford.
*Some New Factors Influencing User Information Satisfaction: Implications For Systems Professionals*—Joshi, et al. (1986), ACM 0-89791-207-1/86/1000-0027.

* cited by examiner

*Primary Examiner* — Christyann Pulliam
*Assistant Examiner* — Mellissa M Ohba
(74) *Attorney, Agent, or Firm* — Charles L. Moore; Moore & Van Allen PLLC

(57) ABSTRACT

A method for using confidence factors in forming a system may include receiving a tolerable confidence factor. The method may also include utilizing only resources and relationships of a plurality of resources and relationships with confidence factors equal to or greater than the tolerable confidence factor to form the system.

16 Claims, 6 Drawing Sheets

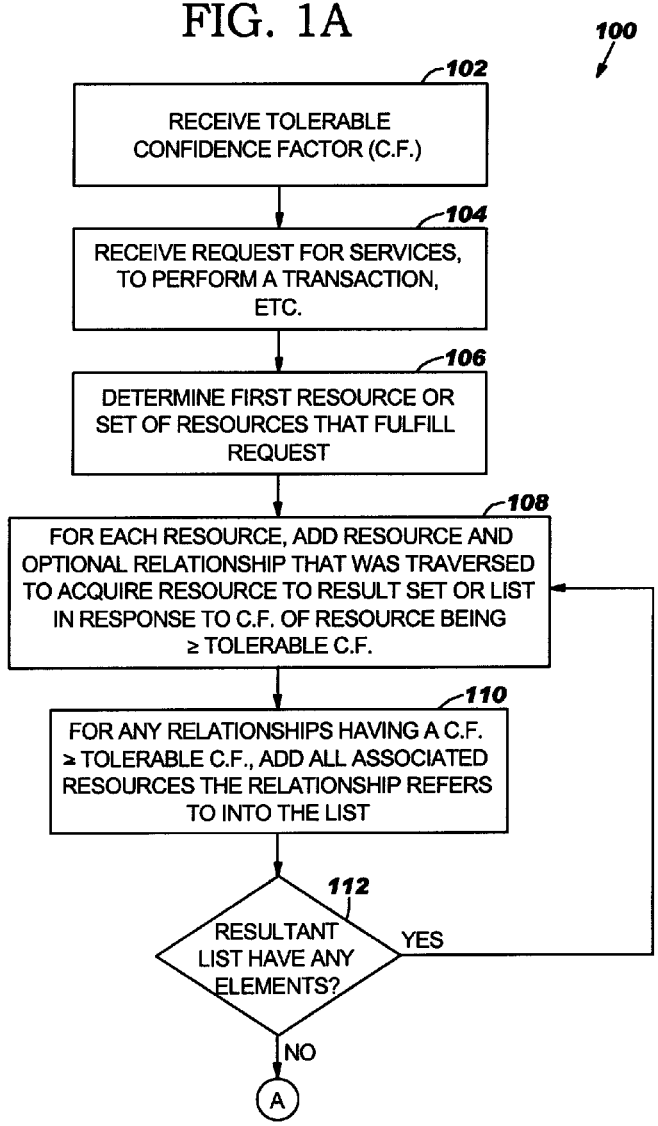

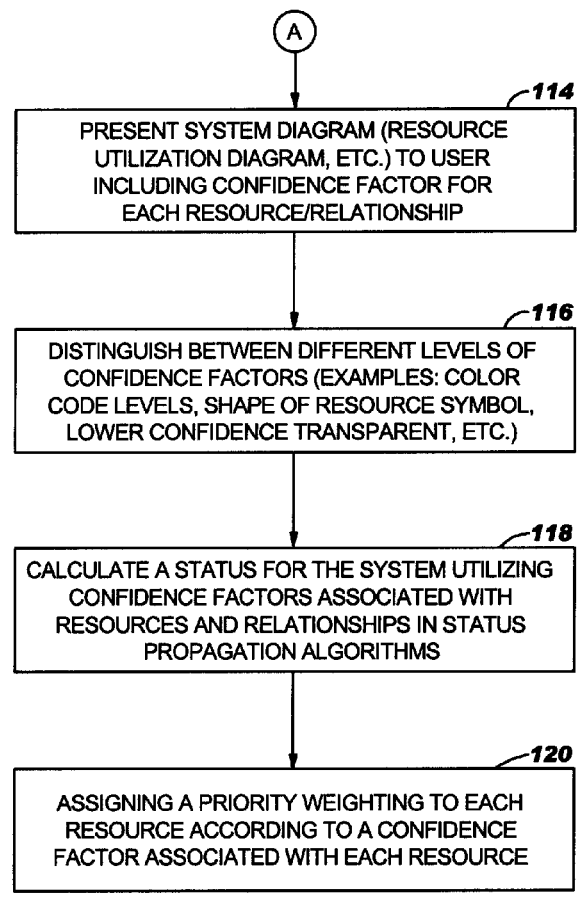

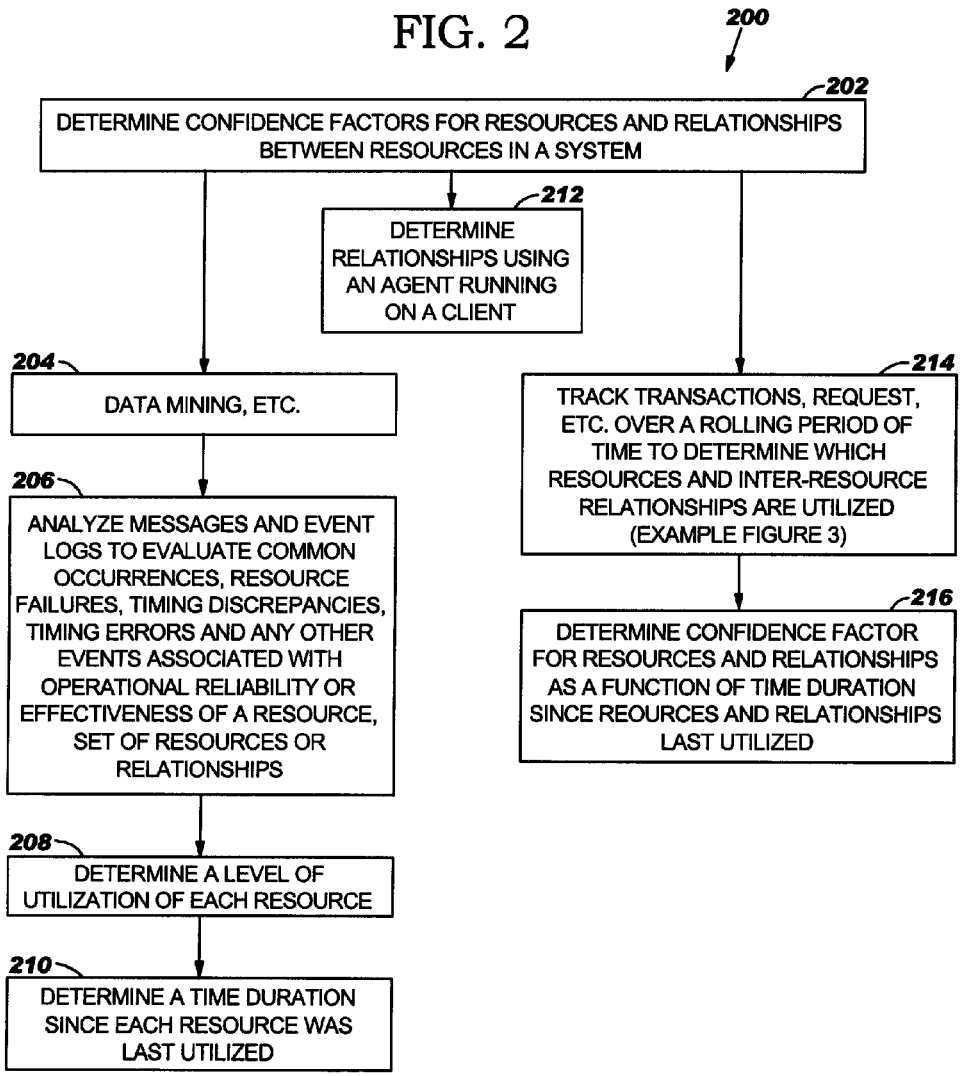

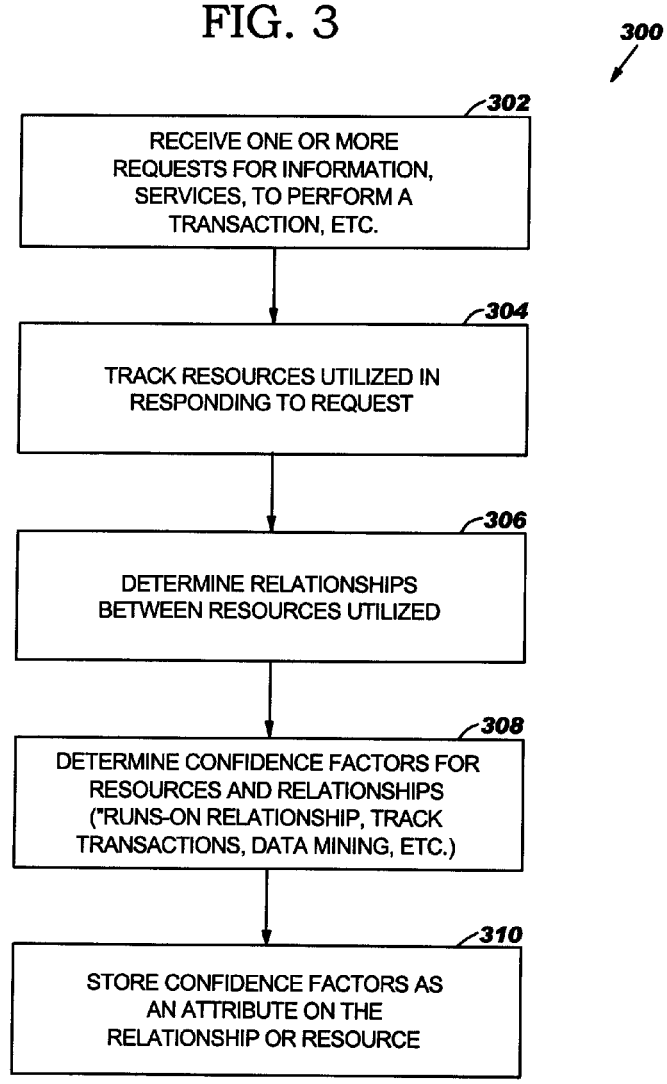

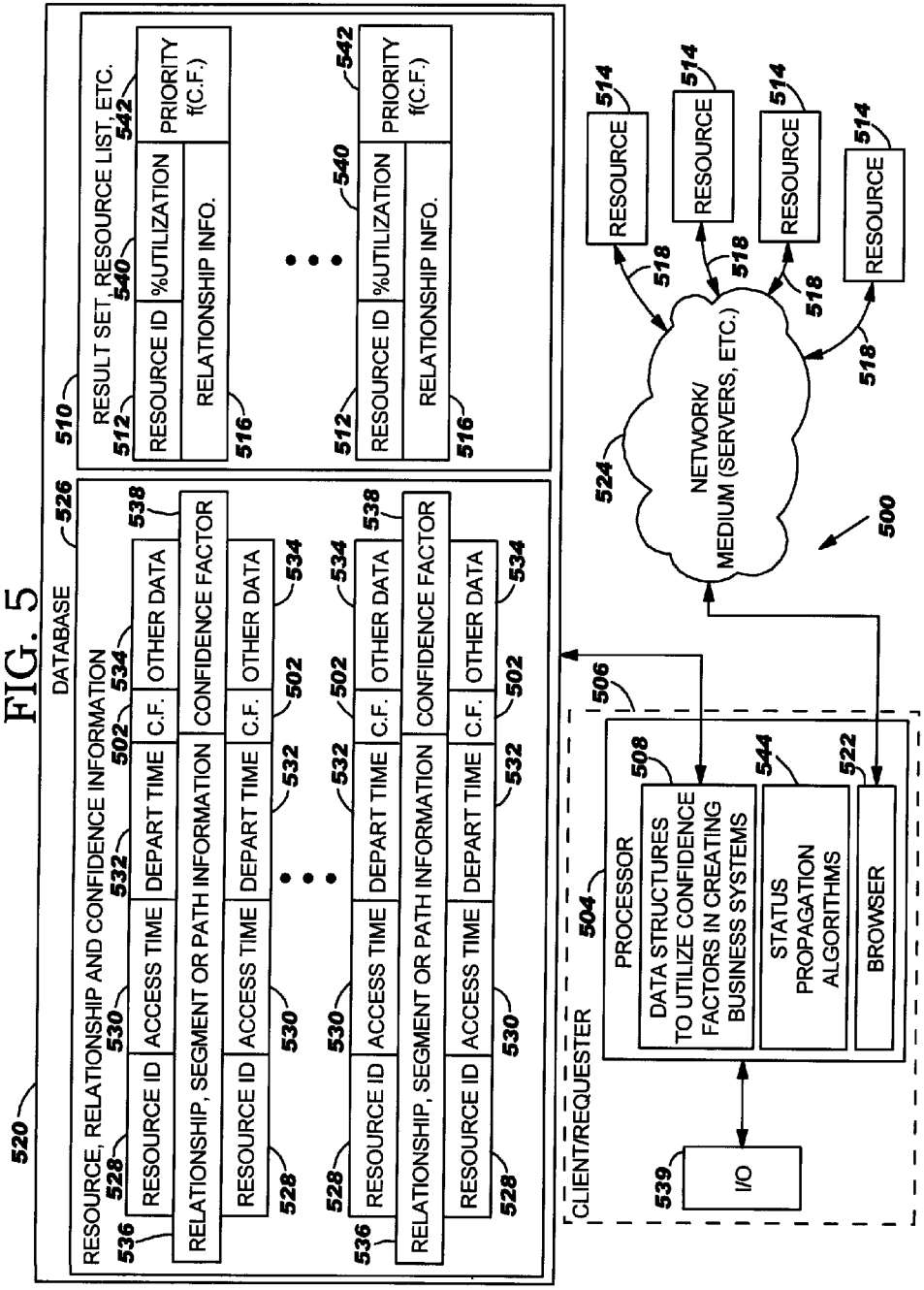

US 8,924,343 B2

METHOD AND SYSTEM FOR USING CONFIDENCE FACTORS IN FORMING A SYSTEM

BACKGROUND OF INVENTION

The present invention relates to forming systems and more particularly to a method and system for using confidence factors in forming a system, such as a business system or the like.

Within the information technology industry, Information Technology Infrastructure Library (ITIL) and more specifically its Change Management process is being embraced and driving all IT vendors to record all of the resources they manage and relationships between the different resources in a database. Analysis of the different resources and systems formed by these resources may be performed, such as determining confidence in the accuracy or correctness of the different resources and relationships recorded in the database. Resources are typically aggregated into collections to form systems, such as business systems or the like. Relationships between resources are traversed to recursively aid in auto-populating these systems. Status across all of the resources that may form a system may be examined to yield a status for the system. The resulting system could include resources that are below a tolerance of acceptable accuracy. For example, if an enterprise has a critical business process such as funds transfer, the enterprise would not want resources associated with the funds transfer business system that may only be 70% accurate.

BRIEF SUMMARY OF INVENTION

In accordance with an embodiment of the present invention, a method for using confidence factors in forming a system may include receiving a tolerable confidence factor. The method may also include utilizing only resources and relationships of a plurality of resource and relationships with confidence factors equal to or greater than the tolerable confidence factor to form the system.

In accordance with another embodiment of the present invention, a system for using confidence factors to form a system may include a data structure to receive a tolerable confidence factor. The system may also include a data structure to utilize only resources and relationships with confidence factors equal to or greater than the tolerable confidence factor to form the system.

In accordance with another embodiment of the present invention, a computer program product for using confidence factors in forming a system may include a computer readable medium having computer readable program code embodied therein. The computer readable medium may include computer readable program code configured to receive a tolerable confidence factor. The computer readable medium may also include computer readable program code configured to utilize only resources and relationships with confidence factors equal to or greater than the tolerable confidence factor to form the system.

BRIEF DESCRIPTION OF THE DRAWINGS

FIGS. 1A and 1B (collectively FIG. 1) are a flow chart of an example of a method for using confidence factors in forming a system in accordance with an embodiment of the present invention.

FIG. 2 is a flow chart of an example of a method to determine confidence factors for resources and relationships between resources in a system in accordance with an embodiment of the present invention.

FIG. 3 is flow chart of an example of a method to track transactions, requests or the like over rolling periods of time to determine which resources and inter-resource relationships are utilized in accordance with an embodiment of the present invention.

FIG. 5 is an example of an exemplary system for using confidence factors in forming a system in accordance with an embodiment of the present invention.

DETAILED DESCRIPTION OF THE INVENTION

Figure 4:
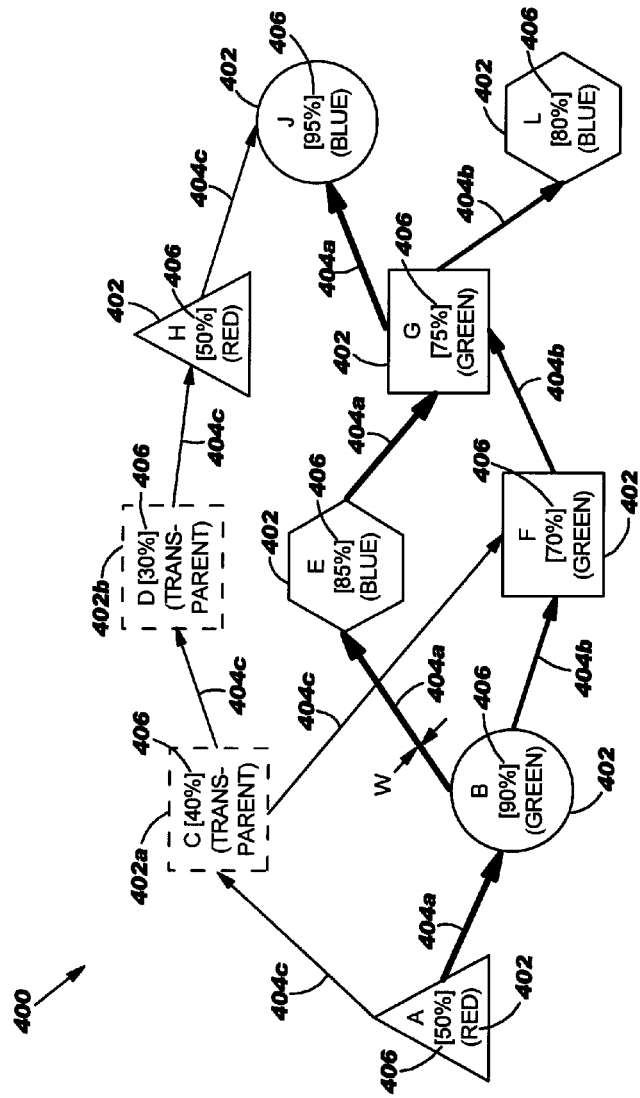
FIG. 4 is an example of a system diagram or resource utilization diagram representing confidence factors in accordance with an embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, or semiconductor system, apparatus, device, or medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. , In the context of this document, a computer-usable or computer-readable medium may be any medium that can contain, store, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIGS. 1A and 1B (collectively FIG. 1) are a flow chart of an example of a method 100 for using confidence factors in forming a system in accordance with an embodiment of the present invention. In block 102, a tolerable or acceptable confidence factor (C.F.) may be received by a system, such as system 500 of FIG. 5, for using confidence factors in forming a business system or the like. The tolerable confidence factor may be entered by a user into the system. The confidence factor may be expressed as a percentage or probability that a particular resource or relationship between resources will function properly or with a level of accuracy expressed by the percentage to fulfill a request.

In block 104, a request may be received. The request may be entered or sent by the user. The request may be a request for services, a request to perform a transaction or other request to auto-populate a business system by traversing the resources and relationships in a database. In block 106, a first resource or a set of resources may be determined that fulfill the request. In block 108, for each resource in the set of resources to fulfill the request, the resource and optional relationship that was traversed to acquire the resource may be added to a list or result set in response to the confidence factor of the resource being substantially greater than or equal the tolerable confidence factor from block 102. The relationship that may have been traversed to acquire the resource may be optional because there may be other relationships or paths that may be traversed in acquiring the resource or in transitioning from one resource to another to fulfill the request.

In block 110, for any relationships to any other resources that may be relevant or applicable to fulfilling the request, an attempt may be made to add any such relevant relationship and associated resources to the result set as auxiliary resources if the relationship's confidence factor is greater or equal to the tolerable confidence factor. The associated resources for each relationship whose confidence factor in greater or equal to the tolerable confidence factor will be collected into a list. Any other relevant resources may be added to the result set or list as auxiliary resources in response to the confidence factors for the relationships and associated resources being greater than or equal to the tolerable confidence factor in block 102.

In block 112, a determination may be made if the list resulting from block 110 has any elements. If the list has any elements, the method 100 may return to block 108 and proceed as previously described. If there are no other resources that may fulfill the request, the method 100 may advance to block 114. In block 114, a system diagram may be presented to the user. The system diagram may be similar to a resource utilization diagram. An example of a system diagram or resource utilization diagram is illustrated in FIG. 4 and will be discussed in more detail with reference to FIG. 4. The system diagram may include a representation of the confidence factor for substantially each resource and relationship.

In block 116, different levels of confidence or confidence factors may be distinguished in the system diagram by different visual characteristics associated with each resource and relationship. For example, different levels of confidence may be color coded; the shape of the icon or symbol representing the resource may be different; or other distinguishing characteristics. Other examples of visual distinction between different levels of confidence or confidence factors may include illustrating a resource transparently if the confidence level for the resource is below a pre-selected level of confidence as illustrated by the broken or dashed line representing resources 402a and 402b in FIG. 4.

In block 118, status propagation algorithms may be used to calculate a status for the system utilizing confidence factors associated with the resources and relationships that form the system. For example, a critical resource whose confidence is only 40% would not impact the system calculated status as much as a critical resource whose confidence is 100%. In block 120, a priority weighting may be assigned to each resource according to the confidence factor associated with each resource. For example, the higher the confidence or confidence factor, the higher may be for the priority for using the particular resource in a system.

FIG. 2 is a flow chart of an example of a method 200 to determine confidence factors for resources and relationships between resources in a system in accordance with an embodiment of the present invention. Block 202 represents in general determining confidence factors for resources and relationships between resources in a system. The blocks below block 202 illustrate examples of different ways that confidence factors may be determined. Any one of the ways or method or different combinations of the methods illustrated may be used to determine the confidence factors. In block 204, data mining or any archived data related to a system or group of requests fulfilled by a system may be analyzed to determine confidence factors. For example, in block 206, messages and event logs may be analyzed to evaluate common occurrences, resource failures, timing discrepancies, timing errors and any other events that may be associated with the operational reliability or accuracy of a resource, set of resources or relationship traversed to acquire a resource. For example, analysis may determine that resource B always seems to have a failure right after resource A has a failure. The confidence in this approach could be proportional to the strength of the pattern seen.

In another example of data mining, a 10 millisecond (ms) difference over 30 days may correspond to a higher confidence factor of about 80%, whereas a variable timing difference of about 10-2000 ms over 5 days may indicate a lower confidence of about 40-50%. Similarly, a resource discovered 30 days ago that has regular interactions in the environment may be deemed 100% confident in its existence. In contrast, a resource not discovered on scans and not having had events received to present positive confirmation of its existence may have its confidence downgraded to about 0% based upon elapsed time.

In block 208, a level or amount of utilization of each resource may be determined. Resources with low levels of utilization may be assigned correspondingly low confidence factors. In block 210, a time duration since each resource was last utilized may be determined. The longer the time since a resource was last utilized, the lower the corresponding confidence factor may be for the resource and any associated optional relationships.

In block 212, another example of how to determine confidence factors for resources and relationships may be using an agent running or operating on a client. For example, an agent running on a user's machine may discover with substantially 100% confidence that a particular application, such as the "Credit Card Processing Application" resource has a "RunsOn" relationship to the resource representing the system machine server.acme.com. If the agent only runs periodically, the confidence factor may degrade as time elapses. If the agent has the ability to immediately inform the system of changes to the application, server, resources, and relationships the confidence factor will be 100%.

Another example of determining confidence factors for resources and relationships between resources is illustrated in blocks 214 and 216. In block 214, transactions, requests or the like may be tracked over a rolling period of time to determine which resources and inter-resource relationships are utilized. An example of tracking resources over a rolling time periods is described in U.S. patent application Ser. No. 10/711,956, filed Oct. 15, 2004, entitled "Method and System to Automatically Define Resources Forming an IT Service," assigned to same assignee as the present application and incorporated herein in its entirety by reference. Another example of tracking transactions, requests or the like over rolling periods of time to determine which resources and inter-resource relationships may be utilized is described in more detail with reference to FIG. 3.

In block 216, confidence factors may be determined for each resource and relationship as a function of time duration since each resource and relationship was last utilized. For example, a period of 30 days since a resource was utilized may correspond to a confidence factor of about 60% whereas a one day interval since the resource was last utilized may correspond to about a 90% confidence factor to determine which resources and inter-resource relationships are utilized in a system.

FIG. 3 is flow chart of an example of a method 300 to track transactions, requests or the like over rolling periods of time to determine which resources and inter-resource relationships are utilized in accordance with an embodiment of the present invention. In block 302, one or more requests for information, requests for services, requests to perform transactions or the like may be received. In block 304, resources utilized in responding to requests may be tracked. In block 306, relationships between resources utilized may be determined. Determining relationships between resources may be similar to that previously described with respect to data mining in blocks 204-210 and runs-on relationships or using an agent in block 212 of FIG. 2. In block 308, a confidence factor may be determined for each resource and associated relationship as described by method 200. In block 310, confidence factors may be stored in a database as attributes associated with each relationship and resource.

FIG. 4 is an example of a system diagram 400 or resource utilization diagram representing confidence factors in accordance with an embodiment of the present invention. The system diagram may be formed similar to that described in U.S. patent application Ser. No. 10/711,042 filed Aug. 19, 2004 and entitled "Method and System to Evaluate Utilization of Resources." The diagram 400 may represent a sequence of utilization of a plurality of resources, such as network adapters, routers, web sites, database servers and the like, that may be accessed or utilized in responding to a request or a set of requests. Each of the resources may be represented by a predetermined resource symbol 402 in diagram 400. Each relationship or path between resources may be represented by a line 404 between sequential resource symbols 402. Each line 404 may have a selected line width "W" corresponding to a quantity or number of occurrences of the segment in responding to a request or set of requests. For example, a higher quantity of occurrences of each segment between resources may correspond to a wider selected width "W" of the line 404 compared to a lower quantity of occurrences of a segment. To further illustrate this feature, lines 404*a* have the widest selected width and represent segments with the highest quantity of occurrences. Lines 404*c* have the narrowest selected width and represent segments with the lowest quantity of occurrences in the sequence and lines 404*b* have a selected width between the widths of lines 404*a* and 404*c* illustrating an intermediate quantity of occurrences of the segments represented by these lines. Similarly, resources 402 could be enlarged to convey a high usage, or shrunk to covey seldom use. The diagram 400 may represent a utilization of resources in responding to a request or set of request or performing a transaction or set of transactions over a predetermined time period or rolling time period.

Each resource symbol 402 may be represented with a predetermined attribute that may correspond to a feature or parameter related to the resource. As illustrated in FIG. 4, examples of these predetermined attributes may include a shape of the resource symbol 402, a color of the resource symbol, as illustrated parenthetically in each resource symbol, or similar indication. The attribute may represent a type of resource, a resource status (active or inactive), a confidence factor associated with the resource or similar condition. In an alternate embodiment of the present invention, the confidence factor 406 may also be expressed as a percentage associated with the resource symbol. In the example of FIG. 4, the confidence factor is illustrated in brackets "[ ]" within each resource symbol 402.

In diagram 400 it may be immediately apparent which resources have a higher confidence factor. The confidence factor for each resource 402 may also be displayed in the diagram 400, in a tabular form or other suitable format.

FIG. 5 is an example of an exemplary system 500 for using confidence factors (C.F.) 502 in forming another system, such as a business system or the like, in accordance with an embodiment of the present invention. The system 500 may include a processor 504 associated with a client 506 that may be accessed by a user or requester. Computer readable program code or data structures 508 to utilize confidence factors 502 in forming or creating business systems or similar systems may operate on the processor 504. The data structures 508 may embody elements of the methods 100, 200 and 300 previously described with respect to FIGS. 1, 2 and 3, respectively. The data structures 508 may include computer readable program code configured to form a result set 510 or resource list of resources 514 that may be used to form a business system or the like similar to that described with respect to blocks 118 and 120 of method 100 of FIG. 1. The result set 510 of resources 514 may include a resource identification (ID) 512 to identify the associated resource 514. The result set 510 may also include relationship information 516 related to associated optional relationships that may be traversed to acquire each of the resources 514 added to the result set 510. The optional relationship information 516 may correspond to segments or paths 518 between resources 510. As discussed with respect to blocks 108 and 110 of method 100 (FIG. 1), a resource ID 512 corresponding to a resource 514 and optional relationship information 516 may be added to the result set 510 in response to a confidence factor 502 of the resource 514 being equal to or exceeding a tolerable confidence factor. The result set 510 may be stored or maintained in a database 520.

The system 500 or data structures 508 may also include computer readable program code configured to generate and present a system diagram, such as the diagram 400 of FIG. 4. The system diagram may be formed using resources 514 and relationships 518 corresponding to resource IDs 512 and optional relationship information 516 in the result set 510.

The system 500 may also include a browser 522 operable on the processor 504, or other user input device such as an application running on a computer or a hand held device to access the resources 514 to respond to a request or set of requests or perform a transaction. The browser 522 may access the resources 514 via a network 524 which may form the optional relationships 518 or paths between the resources 514 as described above. The network 524 may be any communication network, such as the Internet, private network or the like. The browser 522 may be Netscape®, Microsoft Internet Explorer® or the like. The data structures 508 may operate in association with the browser 522 to determine confidence factors and use confidence factors in creating a business system or the like.

The database 520 may also store resource, relationship and confidence information 526. The resource, relationship and confidence information 526 may include a resource identification (ID) 528 for each resource 514 that may be accessed or utilized in response to a request or set of requests or to perform a transaction or set of transactions. The resource, relationship and confidence information 526 may also store an access time 530 when the resource 514 was accessed or utilized. The database 520 may also store a departure time 530 when the browser 522 departs a current resource 514 or transitions to another resource 514. This utilization information may be used to determine confidence factors 502 similar to that described with respect to method 200 of FIG. 2. The database 520 may also store the confidence factor (C.F.) 502 for each resource 514 in association with the resource's corresponding resource ID 528. The database 520 may further store any other data 534 that may assist in determining a confidence or confidence factor for the resource 514 associated with resource ID 528.

The resource, relationship and confidence information 526 may further store relationship information 536 or segment or path information and a confidence factor 538 associated with the relationship information 538 that may be used in forming a business system or the like as previously described with respect to method 100 of FIG. 1.

Input and output devices 539 or combination I/O devices may be coupled to the processor 504 to permit the user or requester to operate and interface with the processor 504. The I/O devices 538 may include a keyboard and pointing device to enter requests and a display or monitor. The display or monitor may present a system diagram or the like, such as diagram 400 of FIG. 4, to the user. The I/O devices 538 may also include disk drives, optical, mechanical, magnetic, or infrared input/output devices or the like.

The result set 510 of resources may also include a percentage of utilization 540 of each resource 514 in the result set 510. The result set 510 may further include a priority 542 for selecting the associated resource 514 as part of the system. The priority may be determined as a function of the confidence factor 502 similar to that described with respect to block 120 of FIG. 1. For example, those resources 514 with a higher confidence factor may be assigned a correspondingly higher priority relative to resources with a lower confidence factor. In this way, those resources 514 with a higher confidence factor 502 will have a higher priority and will be selected in responding to a request before resource 514 with lower confidence factors 502.

A status and propagation algorithm 544 may also operate on the processor 504. The status and propagation algorithm 544 may be used to determine a status for a business system or the like formed by the resources 514 influence by using the confidence factor 502 and priority 542 of substantially each resource 514 and relationship 518 forming the system similar to that described with respect to block 118 of FIG. 1.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method operable in a processor to use confidence factors in forming a system, comprising:

receiving, by the processor, a tolerable confidence factor; and utilizing, by the processor, only information technology (IT) resources and relationships of a plurality of IT resources and relationships with confidence factors equal to or greater than the tolerable confidence factor to form the system, wherein the IT resources comprise IT resources that may be at least one of accessed and utilized in responding to at least one request; and a status propagation algorithm to determine a status for the system influenced by using the confidence factor of at least one of each IT resource and relationship forming the system.

2. The method according to claim 1, further comprising determining, by the processor, a confidence factor for at least one IT resource and at least one relationship comprising tracking at least one transaction over a time period to determine which IT resources and inter-resource relationships are utilized, and determining a confidence factor for each IT resource and relationship utilized in the at least one transaction as a function of a time duration since each IT resource and relationship was last utilized.

3. The method according to claim 1, further comprising assigning, by the processor, a priority weighting to each IT resource according to the confidence factor associated with each IT resource.

4. The method according to claim 1, further comprising adding, by the processor, a IT resource and optional relationship traversed to acquire the IT resource to a result set in response to the confidence factor of the IT resource being greater than or equal to the tolerable confidence factor.

5. The method according to claim 1, further comprising for any relationship to another relevant resource, adding, by the processor, the other relevant resource to the result set as an auxiliary IT resource in response to the other relevant IT resource and associated relationship having a confidence factor greater than or equal to the tolerable confidence factor.

6. The method according to claim 1, further comprising presenting, by the processor, a system diagram including a representation of the confidence factor for at least one of each IT resource and relationship and distinguishing between different levels of confidence factors in the system diagram.

7. The method according to claim 1, further comprising determining, by the processor, a status for the system influenced by using the confidence factor of substantially each IT resource and relationship forming the system.

8. A system to use confidence factors in forming a system, comprising: a network; a plurality of information technology (IT) resources, the plurality of IT resources connected to the network;
a database, the database configured to store information on IT resources, relationships between IT resources, and confidence information for the IT resources and the relationships; and
a processor, the processor being connected to the database and the network and comprising:
a data structure to receive a tolerable confidence factor; and
a data structure to utilize only IT resources and relationships with confidence factors equal to or greater than the tolerable confidence factor to form the system, wherein the IT resources comprise IT resources that may be at least one of accessed and utilized in responding to at least one request; and
a status propagation algorithm to determine a status for the system influenced by using the confidence factor of at least one of each IT resource and relationship forming the system.

9. The system according to claim 8, the processor further comprising a data structure to present a system diagram including a representation of the confidence factor for at least one of each IT resource and relationship.

10. The system according to claim 8, the processor further comprising a data structure to distinguish between different levels of confidence factors in a system diagram.

11. The system according to claim 8, the processor further comprising a data structure to assign a priority weighting to each IT resource according to a confidence factor associated with each IT resource.

12. A non-transitory computer readable medium having a computer program product to use confidence factors in forming a system embodied therein, the computer program product comprising computer readable instructions, the computer readable instructions when executed causing a processor to perform:
receiving a tolerable confidence factor; and
utilizing only information technology (IT) resources and relationships of a plurality of IT resources and relationships with confidence factors equal to or greater than the tolerable confidence factor to form the system, wherein the IT resources comprise IT resources that may be at least one of accessed and utilized in responding to at least one request; and
a status propagation algorithm to determine a status for the system influenced by using the confidence factor of at least one of each IT resource and relationship forming the system.

13. The computer readable medium according to claim 12, the processor further performing presenting a system diagram including a representation of the confidence factor for at least one of each IT resource and relationship.

14. The computer readable medium according to claim 12, the processor further performing distinguishing between different levels of confidence factors in a system diagram.

15. The computer readable medium according to claim 12, the processor further performing determining a status of the system influenced by using the confidence factor of at least one of each IT resource and relationship forming the system.

16. The computer readable medium according to claim 12, the processor further performing assigning a priority weighting to each IT resource according to a confidence factor associated with each IT resource.

* * * * *